United States Patent [19]

Haldimann

[11] Patent Number: 5,538,384

[45] Date of Patent: Jul. 23, 1996

[54] PALLET-SUPPORT RAIL AND SLIDE-IN PALLET-STORAGE UNIT WITH PALLET-SUPPORT RAILS AND PALLET-CONVEYOR TRACK

[75] Inventor: Hans R. Haldimann, Lugano, Switzerland

[73] Assignee: Marino Zimmermann, Lugano, Switzerland

[21] Appl. No.: 196,151

[22] PCT Filed: Jun. 21, 1993

[86] PCT No.: PCT/CH93/00159

§ 371 Date: Apr. 20, 1994

§ 102(e) Date: Apr. 20, 1994

[87] PCT Pub. No.: WO94/00370

PCT Pub. Date: Jan. 6, 1994

[30] Foreign Application Priority Data

Jun. 22, 1992 [CH] Switzerland .................... 1960/92

[51] Int. Cl.[6] ............................................... B65G 1/04
[52] U.S. Cl. ...................... 414/286; 414/276; 198/838; 193/35 A; 193/37
[58] Field of Search .................................. 414/276, 268, 414/267, 286; 193/35 R, 37, 35 A, 35 B, 35 C, 40, 2 D; 198/750.1, 838, 845

[56] References Cited

U.S. PATENT DOCUMENTS 2,806,631  9/1957  Van Vactor ............................ 221/13
4,662,511  5/1987  Greener .

FOREIGN PATENT DOCUMENTS

1362524   4/1964   France .
2357444   2/1978   France .
1180312  10/1964   Germany ............................ 198/838
3542927   6/1987   Germany ............................ 198/838
526441    9/1972   Switzerland .
766239    1/1957   United Kingdom .................. 198/838
1276584   6/1972   United Kingdom .

Primary Examiner—Frank E. Werner
Attorney, Agent, or Firm—Tarolli, Sundheim, Covell, Tummino & Szabo

[57] ABSTRACT

The invention concerns a pallet-support rail for the conveyance of pallets and containers, the rail having a pallet-support chain (2, 2a to 2d) designed in the form of a roller chain with a multiplicity of support rollers (11) spaced one behind the other at equal intervals, a rolling surface (4) on which the rollers (11) run and a multiplicity of support links (9) connected to the rollers (11) and designed to be displaced by the rollers (11) along the rolling surface (4). The invention ensures ease of operation and compact design by virtue of the fact that means for lateral control of the support rollers (11) are fitted to the support rollers (11).

26 Claims, 9 Drawing Sheets

PALLET-SUPPORT RAIL AND SLIDE-IN PALLET-STORAGE UNIT WITH PALLET-SUPPORT RAILS AND PALLET-CONVEYOR TRACK

TECHNICAL AREA

The present invention relates to the area of storage and conveyance. It has to do with a pallet-support rail for the conveyance of pallets and containers, including (a) a pallet-support chain in the form of a roller chain with a plurality of evenly spaced support rollers arranged one behind the other;

(b) a running rail on which the support rollers roll; and (c) a plurality of support straps which are connected with the support rollers and are displaceable with respect to the running rail by means of the support rollers.

The invention further relates to a slide-in storage unit for storing pallets and similar containers, the slide-in storage unit including a plurality of shelving channels in side by side and/or vertically stacked arrangement, for the successive lodging and removal of a plurality of pallets and containers from an end of the storage unit.

The invention also relates to a transportation track for the conveyance of pallets and similar containers.

Such a pallet support rail, such a slide-in storage unit, and such a transportation track are, for example, known from the publication U.S. Pat. No. 4,662,511.

STATE OF THE ART

In the area of the storage of pallets or similar containers, there is a need for a conveying track for pallets, primarily wooden pallets, which offers very small resistance to the horizontal movement of the pallet, particularly at the initiation of movement. This conveying track should have the smallest possible vertical height, so that it can be installed in pallet storage units. Such height should be substantially smaller than the height of the typical wooden pallet (<50%), but not by making the roller diameter too small. In order to allow these conveying tracks to be installed in storage units, the said height should nowhere be exceeded, including at the ends of the track where the chain reversal takes place.

One type of conveying track used previously for pallets utilizes a row of aligned rollers upon which the bottom surface of the pallet rolls. Since these bottom surfaces are very irregular and often damaged, there arises a rolling resistance which is high and difficult to calculate, and which for example does not allow a reliable self-starting with the preferred small inclination of the track. The track inclination must always be sufficient, even in the worst case, to generate a sufficient driving force, and therefore it must be quite substantial. However, if it should happen that the roller resistance is small, the excess driving force resulting from the large inclination will lead to dangerous accelerations and thus to inadmissable pallet speeds. Thus, with this approach, expensive braking systems are unavoidable. Analogously, dangerous conditions arise when an attempt is made to shove pallets along a conveyor track against a substantial track inclination in a storage unit, particularly when using the storage technique of the so-called slide-in storage unit, which is more and more being utilized.

Various proposals have already been made for minimizing the risks described above. The described disadvantage can, for example, be basically avoided if the direct, unreliable contact between the underside of the pallet and the rollers is eliminated by the provision of intermediate elements on which the pallets sit without relative movement, the intermediate elements in turn running along the rollers with underside surfaces that are constructed in a mechanically satisfactory way.

The intermediate element which has been the most in use up to now, specifically an auxiliary pallet with the best quality underside which is always connected with the conveying system, has the disadvantage of requiring additional room and the complication that it must be located below the actual load-bearing pallet. Furthermore, catalogued and internationally standardized transport chains are of little use for the described purpose. Such transport chains are intended for unnecessarily high tensile forces, but have such a high resistance against horizontal displacement that they must be motor-driven, such that it is not possible with these units to achieve the desired gravity drive. Moreover, the distance between the upper reach and the lower reach in such chains tends to be quite large due to structural requirements, which leads to an unacceptable wastage of space in the storage unit.

These chains have already been provided with support rollers, and are offered on the market under the description "drive-conveyor-chains". These chains are very heavy and have a large vertical dimension which makes it impossible to install them in a storage unit. They tend to be used for driven transport tracks.

Furthermore, it has already been attempted to have lightweight roller chains with rectilinear straps run over the conventional roller rails utilizing small rollers. The latter has shown itself to be expensive and unstable, because the rollers must be very narrow, leading to a high chain tension with no guarantee that self-starting will take place.

Finally, it has also been proposed to incorporate the support rollers in the chain running surface, such that the support rollers, the chain, the running surface and the corresponding reversal mechanisms co-operate to provide a pallet-support rail. Such an approach is, for example, described in the previously-noted U.S. Pat. No. 4,662,511, which describes well the state of the art thus far attained in this area.

This known solution, however, has an important disadvantage: the chain runs as an endless chain around two reversing wheels constructed as toothed wheels, and is laterally guided exclusively by the reversing wheels, such that because of the small width of the reversing wheels when compared to the length of the support rollers, a very large degree of play is provided. Because of this kind of chain guidance, the chain length or the length of a pallet-support rail must be kept to a small value because otherwise the chain could easily slide off its running track between the reversing rollers. With this construction, therefore, it is not possible to achieve a one-piece pallet-support rail extending over several pallet spaces arranged one behind the other, with a chain extending the full length. Rather, using the prior solution, each pallet space requires the provision of a separate autonomous pair of support rails. This has the result that, when pallets are being loaded into and unloaded from a slide-in storage unit provided with these rails, the pallets do not move uniformly with each other, but instead transmit their movement from one to another through impact whenever they must move from one pallet space to the next. Not only can this lead to damaging of the goods piled on the pallets, but it results in a very non-uniform movement during loading and removal, which can make the operation of the storage unit extremely difficult.

Moreover, the suggested system requires a large construction height, specifically about 7.5 times the roller diameter. Despite the selection of a roller diameter lying at the lowest possible limit, the pallet-support rail has the same height as the pallet being transported thereon.

DESCRIPTION OF THE INVENTION

It is the object of the invention to provide a pallet-support rail along with a corresponding slide-in storage unit and a transportation track which avoid the aforementioned disadvantages, and in particular, make possible an easy and shock-free running of the pallets over a considerable length, and which make possible a compact construction with minimal space requirements.

This object is attained, in a pallet-support rail of the kind mentioned above, in that (c) means are provided on the support rollers for laterally guiding the support rollers.

The essence of the invention is to provide, for the pallet-support chain, a low-friction and space-saving lateral guidance over the entire supporting chain length, the guidance being directly connected to the support rollers themselves. In this manner, it is possible to transport several pallets or all pallets of a shelf channel on a single pallet-support chain, thus making possible a shock-free, smooth movement.

A first preferred embodiment of the pallet-support rail in accordance with the invention is characterized in that (a) the support rollers are connected together in pairs at both ends by means of a pair of side straps;

(b) the running rail has a width which is smaller than the spacing between the two side straps of a pair; and (c) the side straps extend downwardly sufficiently far to transfer lateral forces from outside to the running rail, and thus laterally guide the pallet-support chain.

In this case, the lateral guidance is particularly easy to achieve, without making it necessary to carry out costly modifications of the support rollers.

A second preferred embodiment of the pallet-support rail in accordance with the invention is characterized in that the support rollers have the configuration of edge rim rollers and include in the central region a circumferential guiding groove, while a raised guidance rib is provided on the running rail, the rib projecting into the guidance groove and thus laterally guiding the support rollers. This embodiment is more costly because of the rollers, but is nonetheless more flexible in terms of the side straps, the width of the running rail and the size of the rollers.

A third preferred embodiment of the pallet-support rail according to the invention is characterized in that (a) the support rollers are constructed as rim rollers and include circumferential rims at the extremities;

(b) the width of the running rail is smaller than the spacing between the two roller rims; and (c) the roller rims project downwardly far enough to allow them to transmit lateral forces sidewards from the exterior to the running rail, thus laterally guiding the pallet-support chain.

In this case, the lateral guidance is similar to that of the second embodiment, although the guidance can be maintained at a lower level because the raised guidance rib is lacking.

A further preferred embodiment of the pallet-support rail in accordance with the invention is characterized in that the support rollers are connected in pairs in the pallet-support chain by the support straps, the support straps and the side straps being arranged alternatingly such that each support strap and a neighbouring pair of side straps have one support roller in common, and in that the support rollers are each rotatably mounted about a chain pin which in turn is securely connected with the side straps of a pair. The alternating arrangement of support straps which carry the pallet and side straps which perform the lateral guidance function, permits the support function and the guidance function to be decoupled, which is favourable for the running movement.

Another preferred embodiment of the pallet-support rail according to the invention is characterized in that the support rollers are mounted to the chain pins by means of roller bearings. By this means, the roller friction is minimized, and an extraordinarily easy self-starting is attained, even with small inclinations.

Another preferred embodiment of the pallet-support rail in accordance with the invention is characterized in that (a) there is provided at one end of the pallet-support rail a chain reversal mechanism which causes the pallet-support chain to reverse direction, thus dividing it into an upper reach and an underlying lower reach;

(b) the running rail is part of a support profile; and (c) the support profile is configured, below the running rail, as a largely closed return channel in which the lower reach of the pallet-support chain is received and guided.

With this embodiment of the inventive pallet-support rail, it is possible to attain a more compact and space-saving construction while at the same time ensuring easy running of the chain and optimal protection against contamination.

A further preferred embodiment is characterized in that the overall height of the pallet-support rail with the upper reach and the lower reach does not, or not significantly, exceed three times the diameter of the support rollers and/or half the height of a standardized euro-pallet, in that the chain reversal mechanism is so constructed that the overall height limitation is also maintained in the reversal region, in that the chain reversal mechanism includes a reversal element with a resiliently mounted support curve upon which the support rollers of the pallet-support chain run during the reversal, and in that the reversal element with the resiliently mounted support curve is constructed as a resiliently mounted boss with an inner ring, a resilient intermediate ring and an outer ring.

In this manner, it is possible to attain minimal construction height for the entire pallet-support rail, wherein at the same time, while avoiding the polygon effect, a smoother motion at the reversal of the chain is ensured.

In another preferred embodiment of the inventive pallet-support rail, the running rail is surrounded laterally by a lower-lying support surface, and the guiding side straps extend downwardly far enough that they are spaced only a short distance from the support surface, and come into contact with the support surface in the event of tilting of the pallet-support chain. This means guarantees minimal disturbance in the operation of the rail, even under difficult conditions, because tilting of the chain is held to a minimum.

A further preferred embodiment of the invention is characterized in that the upper reach and the lower reach together constitute a closed loop which at the other end of the pallet-support rail is entrained over a rearward reversal mechanism, and in that only about half the length of the circulating loop is constituted by a pallet-support chain, while the other half of the loop consists of a tension means which connects the ends of the pallet-support chain together in order to transmit tension forces. In this manner, the cost and weight of the chain are reduced and movement is improved.

The inventive slide-in storage unit for storing pallets and containers, which storage unit includes a plurality of sidewardly or vertically positioned shelf channels with several pallet spaces arranged one behind the other for the successive storage and removal of a plurality of pallets or containers from one side of the storage unit, is characterized in that, for conveying the pallets or containers, there are provided in each of the storage channels at least two parallel-arranged pallet-support rails with corresponding pallet-support chains, and in that the pallet-support rails extend integrally over several pallet spaces, preferably over the entire length of the shelving channel. The slide-in storage unit, in accordance with the invention, has the particular advantage that each pallet, over prolonged phases of the loading and unloading process, or over the entire loading and unloading process, retains a fixed position with respect to the chain, so that many or all pallets move smoothly and synchronously with the chain.

According to a first preferred embodiment of a slide-in storage according to the invention, means are provided to ensure tandem running of the pallet-support chains in each shelving channel. This eliminates the risk that relative movement between the chains will result in a twisting of the pallets and thus interfere with the storage operation.

In order to simplify the operation of the storage unit, it is further advantageous, in accordance with a second preferred embodiment of the inventive slide-in storage unit, to provide on at least one pallet-support rail of each shelving channel, a means for determining the position of the respective pallet-support chain. This provision allows operating personnel to determine the extent to which a given shelving channel is filled.

The transport track according to the invention, for conveying pallets and similar containers, is characterized in that the transport track includes at least two pallet-support tracks arranged in parallel with corresponding pallet-support chains.

Further embodiments of the pallet-support rail and the slide-in storage unit in accordance with the invention are presented in the dependent claims.

BRIEF DESCRIPTION OF THE DRAWINGS

The invention will be more particularly described below with respect to the example embodiments with reference to the figures. The figures show FIG. 1 in cross-section a preferred example embodiment for a pallet-support rail according to the invention, in which a chain component in the upper reach is sectioned along the line A—A in FIG. 2, whereas a chain member in the lower reach is illustrated in elevation, looking in the chain direction.

CARRYING OUT THE INVENTION

Figure 1:
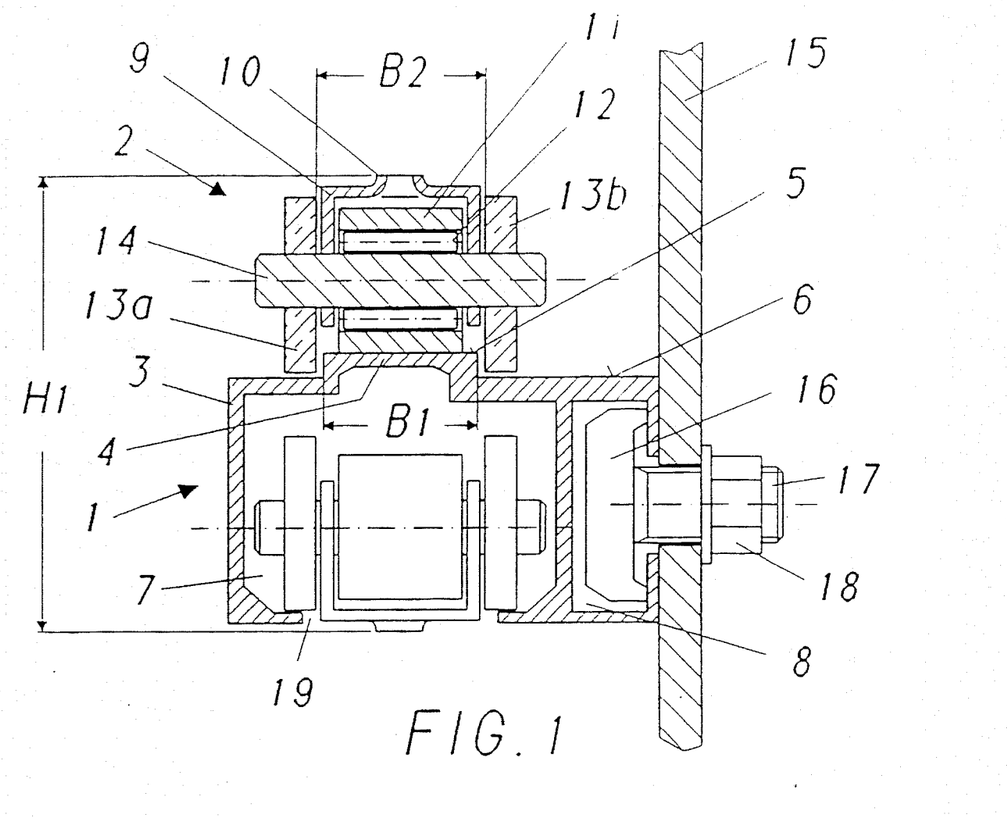
Figure 2:
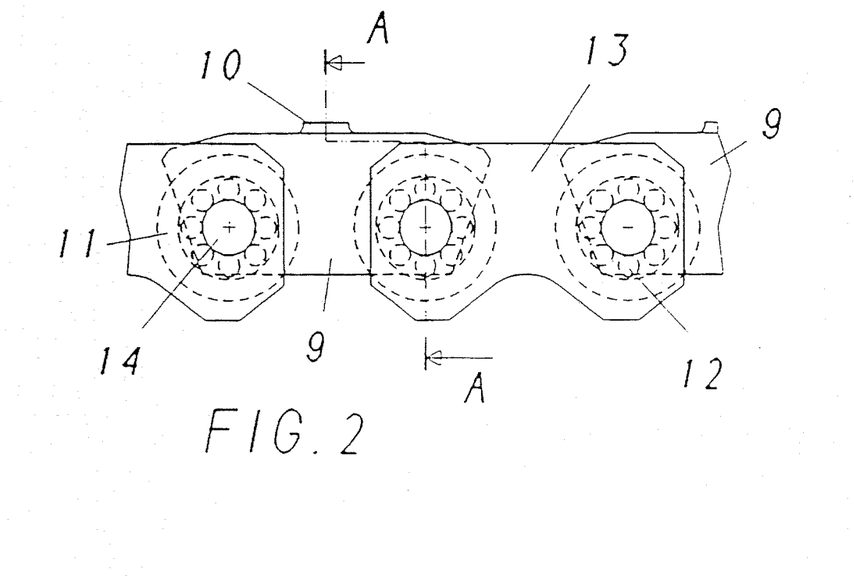
FIG. 2 the side elevation of a section of a chain in the upper reach of a pallet-support rail according to FIG. 1.

In FIGS. 1 and 2 there is illustrated a preferred embodiment of a pallet-support rail in accordance with the invention. FIG. 1 shows the support rail in cross-section, in which a chain segment of the upper reach (OT in FIGS. 3–5) is sectioned along the line A—A in FIG. 2, whereas a chain segment from the lower reach (UT in FIGS. 3–5) is illustrated an elevation taken along the chain direction; FIG. 2 is a side elevation of a chain segment from the upper reach.

The pallet-support rail 1 includes essentially a support profile 3 preferably of extruded aluminum, which has a rectangular section and is formed in its lower portion as a largely closed return channel 7. At least at one side of the support profile 3 (in FIG. 1 the rightward side) there is provided a mounting channel, in which, for securing the support profile 3 to a sideward portion 15 of a shelf unit, the heads of hammer-head fasteners 16 can be inserted such that their threaded shanks 17 register in corresponding bores in the side portion 15, and are secured in place with nuts 18. On the upper side of the support profile 3, there is provided a running rail 4 projecting upwardly from a lower-lying support surface 6, the running rail having a flat running surface 5 on its upper side.

The support profile 3 receives a pallet-support chain 2 which is divided into an upper reach and a lower reach by a reversal mechanism (not illustrated in FIGS. 1 and 2). The upper reach runs along the upper side of the support profile 3, while the lower reach is located in the return channel 7. The pallet-support chain 2 is configured as a roller chain. It includes a plurality of support rollers 11 which are linked together through support straps 9 alternating with pairs of side straps 13, 13a, 13b.

The smooth and rimless support rollers 11 are journaled about fixed chain pins 14 as axes, by way of bearings 12 for the support rollers, the bearings being preferably in the form of roller bearings. They generate a very low level of rolling friction even when stationary. They roll along the smooth running surface 5 of the running rail 4, and there generate likewise a very low level of friction. Both frictional values together lie in the "parts per thousand" region. Since the running surface 5 is flat, i.e. has no concavity, no dirt can collect on it.

The chain pins 14 extend through corresponding bores in the support strap 9, and are press fit in the side straps 13a, 13b. They can project sidewardly out of the side strap 13a, b and be used as drivers for the chain. The chain pins 14 rotate in the bores of the support strap 9 only when the (unloaded) chain reverses direction. The support straps 9 have a U-shaped profile and are upwardly closed in order to avoid contamination of the running surface 5. They can be provided with one or more (optionally jagged) ribs 10 (or serrations 35 according to FIG. 7), which project into and engage the weight of the pallet, so that the pallet located on the pallet-support chain 2 remains immobile on the track and do not become shifted.

The side straps 13a, b project beyond the roller diameter of the support roller 11. Their distance apart B2 is somewhat greater than the width B1 of the running track, so that they guide the pallet-support chain 2 laterally on the raised running rail 4. At the same time the side straps 13a, b are sized in the downward direction such that the lower edges are located only a fraction of a millimetre above the support surfaces 6. Thus, if the chain is subject to external outward forces, the resulting displacement is limited by contact between the side straps 13a, b and the edge of the running rail 4. If the chain is tipped due to external forces, the under-edges of the side strap 13a, b are supported against the support surface 6 of the support profile 3. In this manner there is achieved a low-friction and load-independent lateral guidance and security against tipping of the chain, particularly if the side straps are made of smooth plastic such as PTFE and the support profile is made of aluminum. It should be noted here that, if the side straps are made of a low-friction plastic, it can be necessary and advantageous to provide a strap-like insert made of sheet metal or the like, which also has corresponding bores for the chain pins, and then is encased with the plastic. In this manner, one achieves a high tensile strength in the side strap along with acceptable friction properties.

In the return channel 7, which has a downwardly open, slot-like opening 19, the pallet-support chain 2 is guided in such a way that the side straps 13a, b lie upon the edges of the opening 19 and there can slide with little friction, while the support straps 9 with their serrations 10 hang freely within the opening 19. Trials have indicated that this characteristic of low friction in the lower reach is particularly important for achieving easy running characteristics for the entire pallet-support rail.

As can be readily seen in the side elevation of FIG. 2, the support rollers 11 are connected in pairs, in the pallet-support chain 2, by way of the support straps 9 and the side straps 13. Thus, the support straps 9 and the side straps 13 are in this manner alternatingly arranged such that each support strap 9 and a neighbouring pair of side straps 13a, b have one support roller 11 in common. The height of the chain is determined by the support rollers 11 and the side straps 13. The height H1 of the entire pallet-support rail 1 amounts to at least twice that of the chain height, because of the reversal. In this connection there is necessarily a least distance between the upper and lower reaches, and a minimum height for the running rail 4, in order to ensure lateral guidance. In a successful example embodiment of a pallet-support rail in accordance with the invention, measurements taken, with a roller load of 120 kgs, indicated an overall height H1 of 88 mm, a chain facing of 38 mm and a support roller width 11 of 25 mm. With these dimensions, the typical height of a support rail of a slide-in storage unit does not normally exceed about 87.5 mm.

Figure 4:
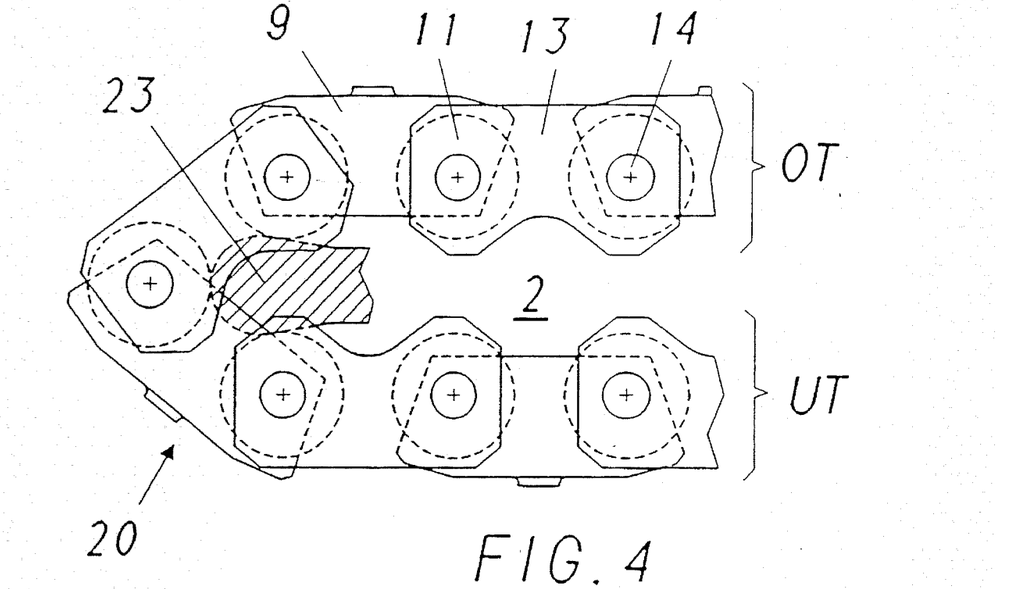
FIG. 4 in side elevation, a second example embodiment for a chain reversal mechanism having a reversal element (23) with a fixed support curve.
Figure 5:
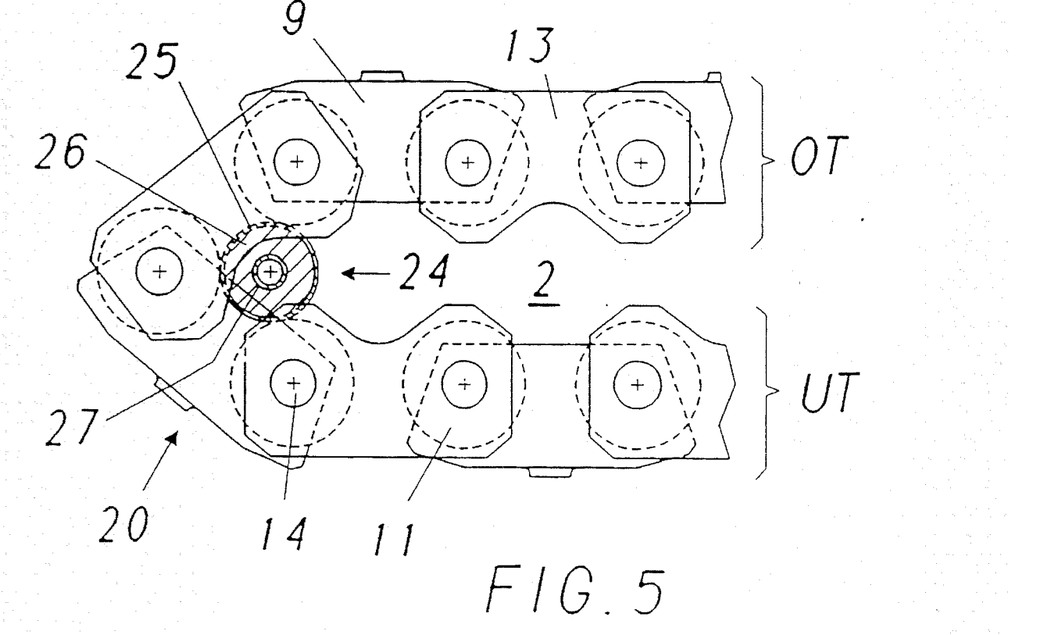
FIG. 5 in side elevation, a third example embodiment for a chain reversal mechanism having a reversal element (24) with a resiliently mounted support curve.

In order not to increase the height H1 at the reversal point, the latter is constructed, for a pallet-support rail as described in the application, in accordance with new approaches. In particular, the reversal mechanism is so constructed that the height H1 does not exceed, or not substantially exceed, three times the diameter of the support roller 11 and/or half of the height of a standardized euro-pallet. FIGS. 3 to 5 illustrate, in side elevations, three different example embodiments with which these goals can be attained.

Figure 3A:
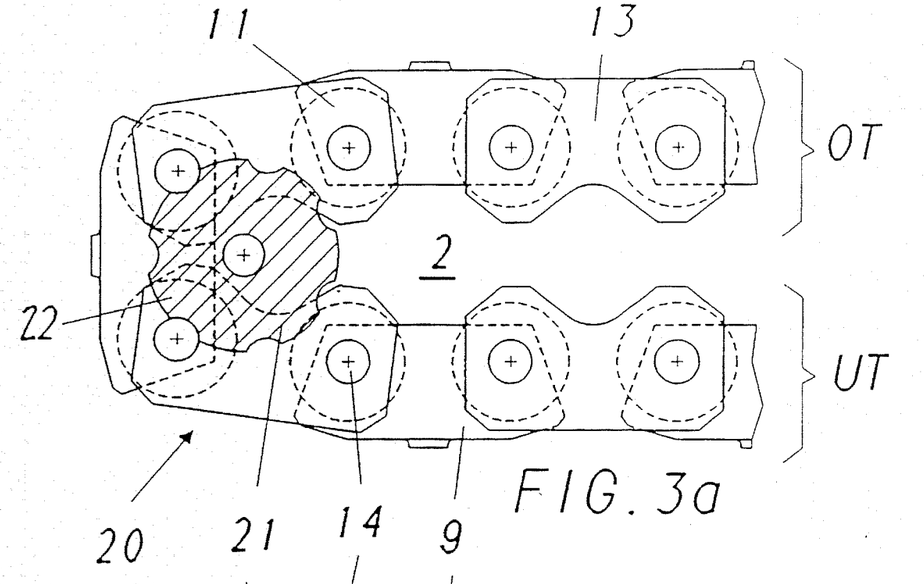
FIG. 3 in side elevation, a first example embodiment for a chain reversal mechanism with a reversal wheel provided with teeth, representing two phases of the reversal (a and b)
Figure 3B:
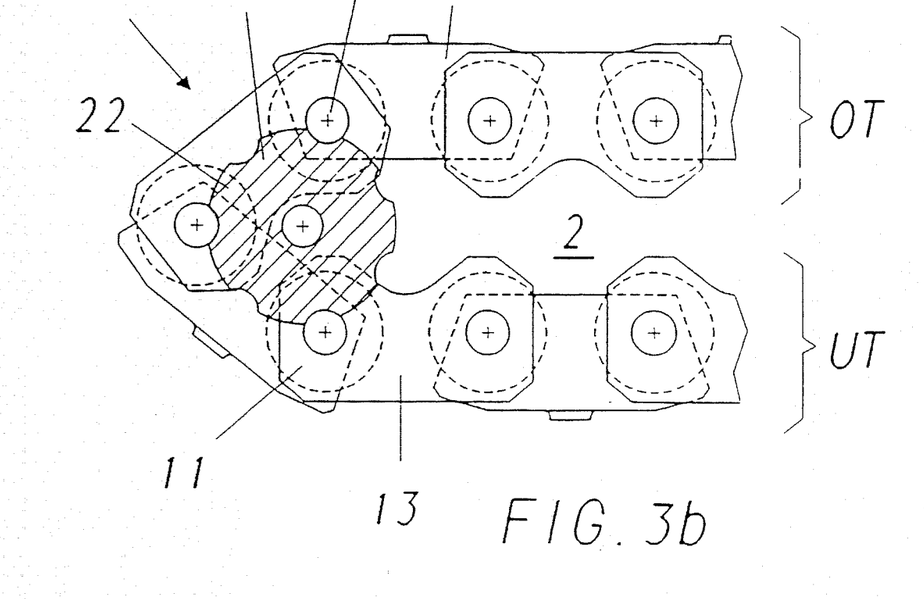

In the example embodiment of FIG. 3, reversal wheels 21 constitute the chain reversal mechanism 20 for the pallet-support chain 2 which is divided into an upper reach (OT) and a lower reach (UT). To allow a better understanding of the reversal process, FIGS. 3a, b show two different phases of the reversal process. The reversal wheels 21 are constructed as 7-toothed wheels provided with teeth 22, the spacing thereof being such that each chain strap skips one tooth (this corresponds to a 3,5-toothed wheel). The outwardly projecting chain pins 14 act as drivers, each for two of the reversal wheels 21 of the support rails. With this construction for the chain reversal mechanism 20, a satisfactory reversal is possible, without exceeding the absolute least height (H1). With a 4-toothed wheel, the height is too great, whereas with a 3-toothed wheel, the reversing movement is no longer smooth.

In the example embodiment of FIG. 4, there is provided in the chain reversal apparatus 20, instead of a rotatably mounted reversing wheel, a non-rotating reversal element 23 with an immoveable support curve (boundary) extending beyond the actual support rail (the attachment is not illustrated in FIG. 4, so as not to clutter the drawing). During reversal, the support rollers 11 of the chain roll around the support curve of the reversal element 23. The individual members of the chain form a polygon at the reversal location, which leads to an uneven running of the chain (the polygon effect). In order to achieve the steadiest possible reversal, the reversal element 23 in cross-section has the form of a droplet. Further, it has been shown that the reversal element 23 should also be of PTFE.

A further example embodiment shown in FIG. 5 is particularly appropriate for eliminating the polygon-effect for a chain reversal. In this example there is provided, extending beyond the actual support rail, a non-rotary reversal element 24 with a resiliently mounted support curve, which can be resiliently displaced under the urging of the shortening effect of the chain polygon, and then will again spring outwardly when the shortening effect is relieved. It is preferable to use, as the reversal element 24, a rubber-mounted hub with a rigid inner ring 27, a rubber-elastic intermediate ring 26 and a rigid outer ring 25, of the kind used for the resilient mounting of machine parts, and known under the name "silent block".

When using several pallet-support rails for a transport track (in particular 2), it is necessary and advantageous, for friction-free operation, to keep the respective pallet-support chains moving in tandem. To this end, the toothed reversal wheels 21 of the different tracks can be locked with each other through a common axle.

Furthermore, the laterally projecting chain pins 14 can be used as drive elements for toothed wheels, which connect the upper reach OT and the lower reach UT together in order to transmit the movement. Alternatively, it is possible to provide the side straps 13a, b on their underside with a stamping resembling a toothed rack (see FIGS. 2–5), thus assuring equal running between the upper reach and lower reach (OT, UT), and allowing the reversal to take place as a loose loop.

Figure 6:
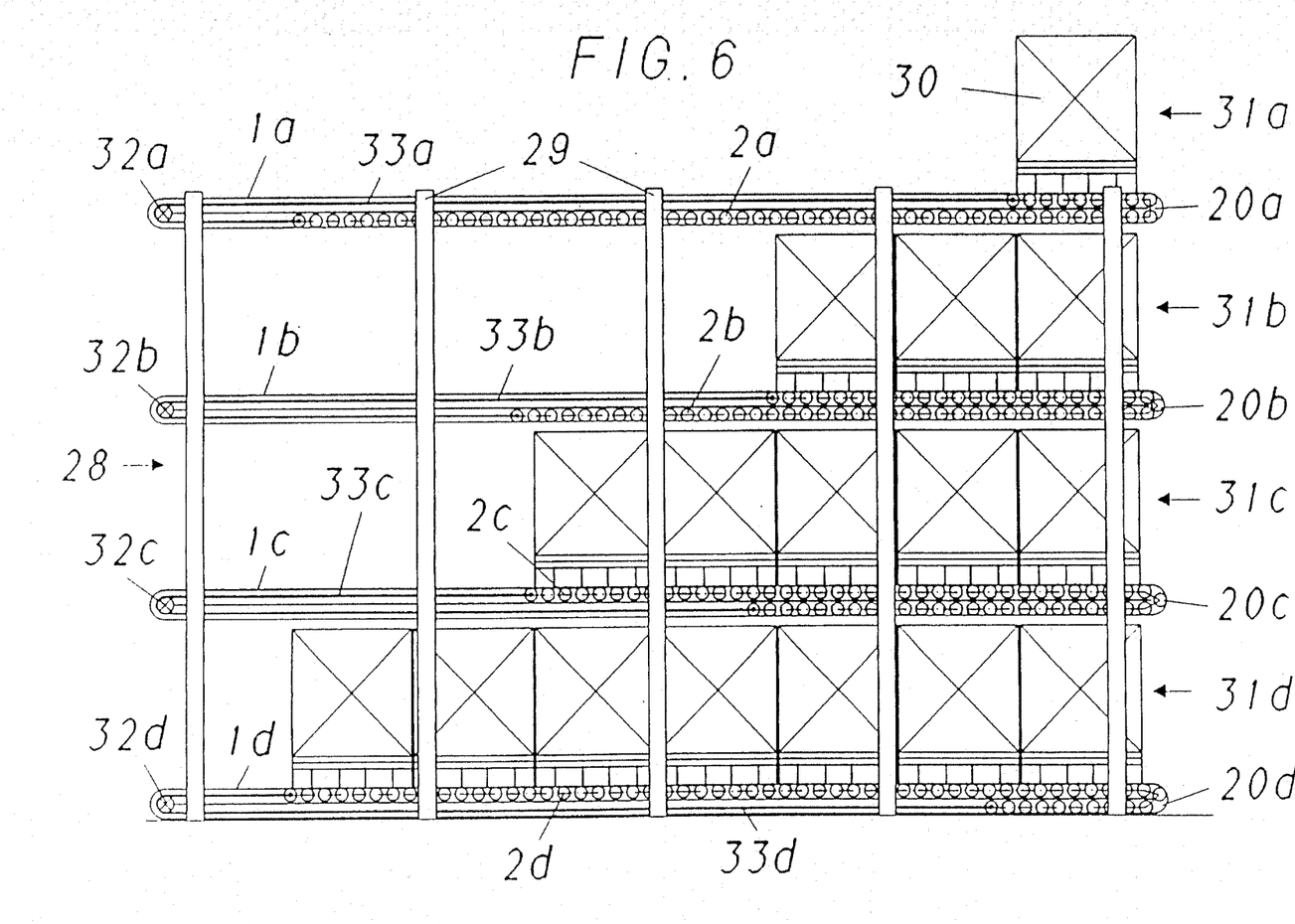
FIG. 6 in side elevation, an example embodiment for a slide-in storage unit in accordance with the invention.

A pallet-support rail as described above is preferably used for storing pallets in a so-called slide-in storage unit. Such a slide-in storage unit 28 is shown in FIG. 6 in side elevation. It is constructed with vertical shelf supports 29, which are connected together by means of cross-beams and stringers (not illustrated). It includes a plurality of vertically and laterally adjacent stacked shelving spaces, each having a plurality of pallet positions located one behind the other. The shelving spaces 31a,d are each provided with a pair of pallet-support rails extending throughout. Each pallet-support rail 1a–d includes a pallet-support chain 2a–d, which is part of an endless chain extending throughout, each endless chain being trained over a forward chain reversal mechanism 20a–d and a rearward reversal mechanism 32a–d.

In such a storage unit, a plurality of pallets 30 are shoved into the shelving spaces 31a–d, from the access corridor (located on the rightward side in the illustration of FIG. 6), against a slight inclination in the pallet-support rails 1a–d, and are held there with detents. When the front pallet is removed, the pallets behind it slide to the end of the shelving space. With the small and easily reproducible friction values of the pallet-support rails in accordance with the invention, a very small and thus non-dangerous slope of less than 1% is sufficient to ensure the gravity-induced automatic movement of the remaining pallets.

In the illustrated slide-in storage unit 28, the pallet-support chains do not undergo a complete circuit. Instead, only a part of the chain is used for support, the said part being equivalent to the full length of the shelving space 31a–d. The remainder of the circulating chain supports nothing. Because of this, each shelving space can be constructed so that half of the endless support is made of pallet-support chain units 2a–d, while the other portion consists of any suitable material capable of transmitting the tensile forces, in particular a return cable 33a–d. Thus, in an empty shelving space, the pallet-support chain is found only at the first pallet location, whereas the remainder of the shelving space length contains the return cable or a corresponding belt (see in FIG. 6 the shelving space 31a with the pallet-support chain 2a and the return cable 33a). The rearward reversal mechanism 32a–d is therefore always in contact with the return cable 33a–d, whereas the forward chain reversal mechanism 20a–d is always in contact with the pallet-support chain 2a–d.

When being loaded, a pallet is deposited at the first pallet location in a shelving space. This takes place without any movement of the chain. When the second pallet is introduced, the first is shoved rearwardly into the shelving space by one pallet length, whereby a corresponding length of the pallet-support chain 2 is withdrawn from the lower return channel 7 of the support profile 3 onto the running rail 4. With the next pallet the same thing occurs, until the entire length of the pallet-support chain 2 lies on the running rail 4 and supports the pallets (compare the successive loading of the shelving spaces 31a–31d in FIG. 6). The row of pallets is held in place at the forward end of the shelving space by a fixed detent, above which the fork-lift is able to raise the first pallet.

During unloading, the first pallet in line is removed, requiring it to be raised above the detent. As the pallet located on the fork-lift is withdrawn, the entire row of pallets remaining in the shelving space undergoes forward movement due to gravity. They are prevented from acceleration by the pallet being removed on the fork-lift. Because the immediately adjacent pallet is not raised and remains in contact with the chain, it automatically comes up against the detent and is held in that position.

In the pallet-support chains 2 thus far described with reference to FIGS. 1–5, the support straps 9 were provided with bores, into which the chain pins 14 had to be inserted during assembly. This assembly technique is relatively time-consuming and thus leads to increased assembly costs. In order to speed up the assembly of the chain components, it is advantageous, in accordance with FIG. 7, to provide, in the support straps 9, downwardly open angulated slots 36, into which the chain pins 14 can be inserted sidewardly (from below). This obviates the time-consuming insertion of the chain pins 14. In order to prevent, in a completely assembled chain, an unforeseen slipping of the chain pins 14 out of the slots 36, it is advantageous to select the separation distance D between the side straps 13, 13a, 13b in the assembled condition, such that they come into contact before the chain pins 14 have slipped too far downwardly along the oblique slots 36.

Figure 7:
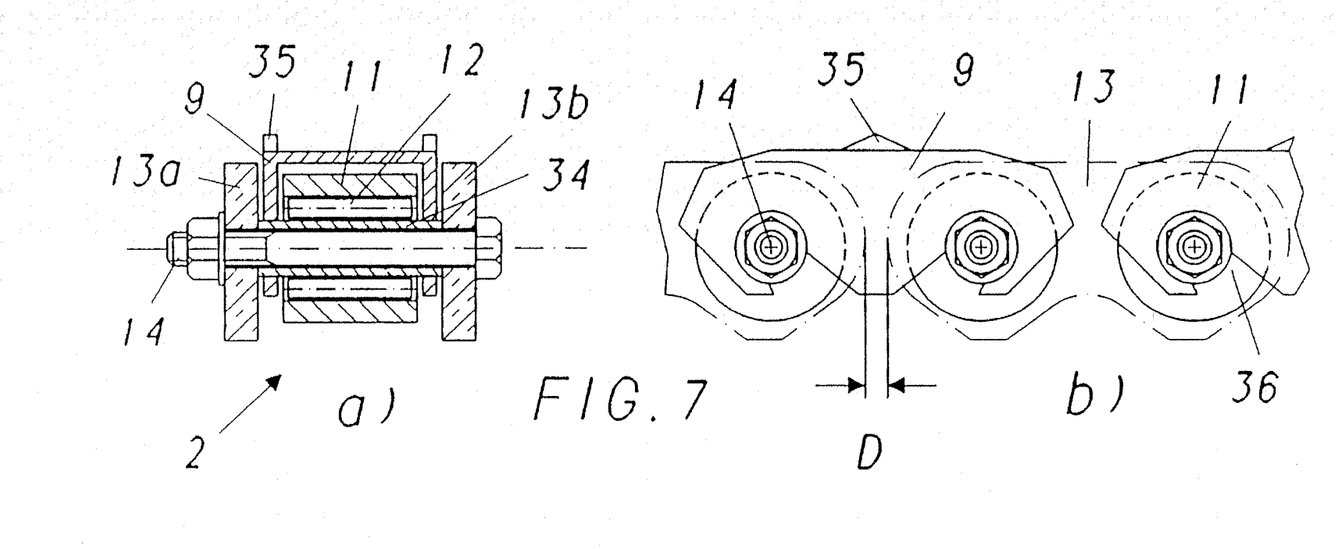
FIG. 7 a representation, analogous to FIGS. 1 and 2, of a further example embodiment of a chain in accordance with the invention, with a simplified mounting for the support rollers, in cross-section (a) and in side elevation (b)

In this connection, it is also appropriate to construct the chain pins 14 as threaded bolts which are tightened against the side straps 13a, b using a spacer sleeve 34. The support rollers are then rotatably mounted about the spacer sleeves 34, wherein the support roller bearing 12 can be a roller bearing or a journal bearing.

The starting resistance of the pallet-support chain 2 in the pallet-support rail 1 in accordance with the invention is less than 2% of the supported load. Because of this, several operational concepts are useful:

The rails are constructed with a gradient of 2%, such that when the first pallet is removed, the entire bulk remaining on the rails is accelerated due to gravity. With this concept, an energy dissipating end stop is necessary.

The tracks can be assembled in a horizontal orientation, so that as the first pallet is removed, those remaining behind on the tracks follow it. A horizontal arrangement is of great advantage with respect to the use of space and the cost of assembly. Energy-dissipating end-stops can be omitted.

In this case, a skilful fork-lift operator can lift and pull the first pallet in such a way that it rests upon the forks with its forward plank, the latter transmitting the pulling force, whereas the rearward plank of the pallet still rests upon the pallet-support chains, and pulls these along at the same time.

an operationally practical solution is to provide the tracks with a gradient of about 1%, so that when the pallets are removed, a very small pulling force must be used, which can be created with a slight inclination of the forks. For security reasons, it is necessary in this case to provide an end stop with a braking device, as will be explained in greater detail below in connection with FIG. 10.

Figure 8:
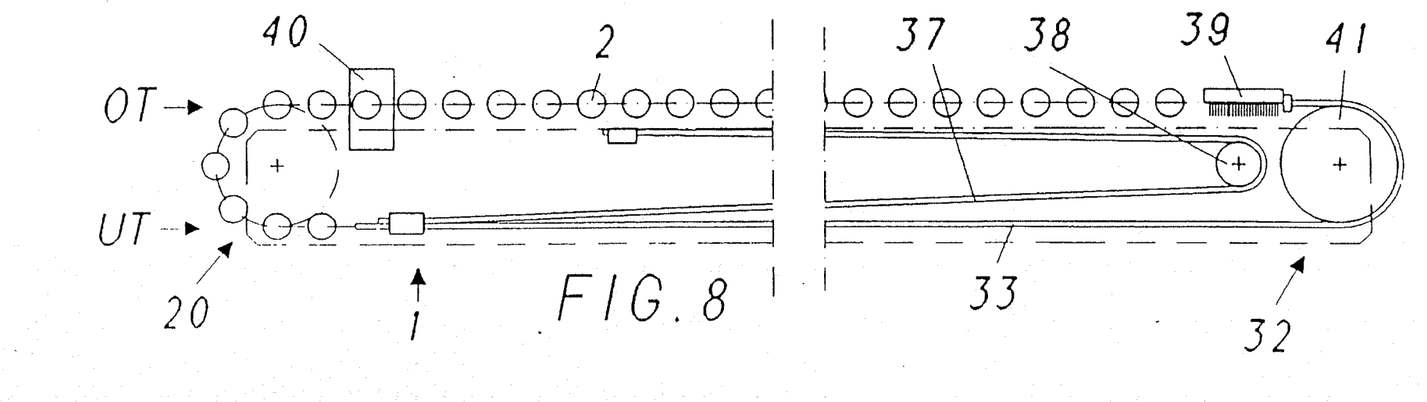
FIG. 8 a schematic side elevation of a preferred example embodiment of a pallet-support rail according to the invention, with a return cable and a resilient cable.

If the pallet-support tracks 1 are assembled in a horizontal position, the driving force, which is provided by gravity in the case of sloping tracks, can be provided by a built-in force accumulator. A preferred example embodiment for such a force accumulator is illustrated in FIG. 8. FIG. 8 shows schematically a pallet-support track 1 with an upper reach OT and a lower reach UT, as well as a corresponding chain reversal mechanism 20 and a rear reversal mechanism 32. The endless support device is made up of a pallet-support chain 2 represented by rollers, and a return cable 33 which is entrained around a reversal roller 41 in the rearward reversal mechanism 32.

There is provided between the pallet-support rail 1 and the endless support device, as a force accumulator, a resilient cable 37 which is also entrained about a reversal roller 38. The resilient cable 37 has a low tension when the pallet-support chain 2 is mostly located in the lower reach UT, and gradually increases in tension and develops an increasing return pull, the further the pallet-support chain 2 is drawn out of the lower reach UT and into the upper reach OT. Thereby arises an effect similar to the gravitational urging of the pallets which takes place when a gradient is present. The tension of the pallet-support chain 2 itself can also be arranged by providing a return cable 33 which is also elastic, i.e. it is either a resilient cable or incorporates a tension spring.

As illustrated in FIG. 8, the invention further provides, to achieve a permanent automatic cleaning of the running surface in the upper reach OT, a brush 39 between the pallet-support chain 2 and the return cable. The brush 39 lies with its bristles on the running surface, and removes contamination from the running surface when it is drawn over the running rail along with the pallet-support chain 2 during storage or removal of pallets. The function of the control mechanism illustrated in FIG. 8 at the numeral 40 will be further described below.

As already mentioned above, there are in each shelving space, within the slide-in storage unit shown in FIG. 6 according to the invention, at least two parallel pallet-support rails with corresponding pallet-support chains, each being constructed as a single unit, and extending over several pallet spaces or the entire length of the shelving space. In order to ensure that the pallets do not tilt or rotate about a vertical axis, all of the pallet-support chains of a given shelving space must necessarily move in tandem with each other. In connection with FIG. 3 it has already been explained that tandem displacement can result from a coupling of the toothed reversal wheels 21. Various other example embodiments to ensure tandem displacement are illustrated in FIGS. 9a–c.

Figure 9:
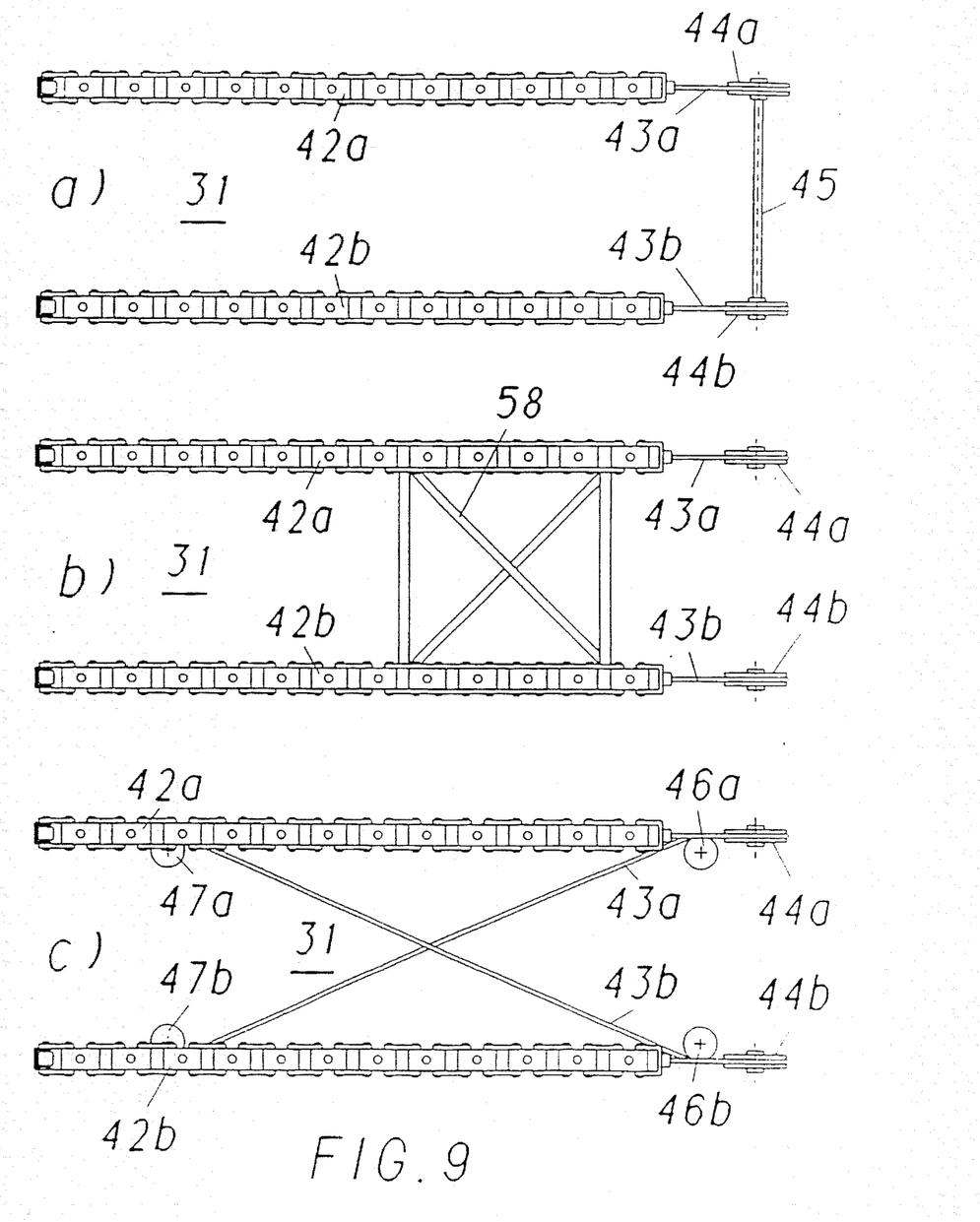
FIG. 9 various (a–c) example embodiments for means adapted to ensure tandem movement of the pallet-support rails in the storage channels of a slide-in storage unit according to FIG. 6.

The FIGS. 9a–c each show, in plan view inside a shelving space, two parallel pallet-support chains 42a–b in the upper reach, which at one end changes to a corresponding return cable 43a–b. The return cables 43a–b are entrained around reversal rollers 44a–b in the rearward reversal mechanism. In the first example embodiment of FIG. 9a, both reversal rollers 44a,b are connected together through a common axle 45 to which they are locked. In the second example embodiment shown in FIG. 9b, the first pallet-supporting elements of both pallet-supporting chains 42a–b are connected through corresponding cross braces to form a roller guide 58, which also maintains both chains parallel to each other. In the third example embodiment shown in FIG. 9c, the return cables 43a–b—for example, by way of corresponding rollers 46a–b and 47a–b—are crossed such that each connects with the other chain so that every movement of one chain necessitates a corresponding movement in the other chain.

In the operation of a slide-in storage unit according to FIG. 6, it would be advantageous for the operator of the apparatus (for example, the fork-lift) to find out how many pallets are sitting in the individual shelving spaces. Since he always works only with a single pallet which is located at the front end of each pallet level, he cannot immediately determine how many other pallets are behind the front one, and especially whether he can shove in an additional pallet. Consequently, it is expedient and advantageous to provide, at least on one pallet-support rail of each shelving level, some means for indicating the position of the corresponding pallet-support chain.

In order to indicate the chain position, there are a number of solutions: To begin with, the indicator means can include a simple optical coding of the individual members and/or segments of the pallet-support chains. In this case, the lowest comfort level would be attained by arranging for the last portion of the chain members, which projects from the lower reach when the last pallet is placed in position, be noticeably coloured (for example with signal-red). In order to protect the paint from deterioration over a long period, the support straps 9 can be correspondingly stamped. An improved solution would be to provide, in the said stampings of the support straps 9, bar-code labels which can be read by a reading apparatus provided between the forks of the fork-lift. These labels provide information, readable at the front face of the storage unit, concerning the level number, the service positions, and the correct condition of the chain, particularly whether it can receive pallets without loss of space. It is further conceivable that, as an indicator of the number of pallets shoved into a given storage level, aluminum identification plates can be fastened to the side straps 13. These aluminum identification plates would, for example, carry numerals that are easily seen, and which can be read by the fork-lift operator.

Alternatively, the indicator means can include the already-mentioned control apparatus 40 (FIG. 8), which automatically (i.e. using a light box or electric contact data or contact-free electromagnetic measurements) detects individual members and/or segments of the pallet-support chain 2 and therefrom determines the condition of the chain and transmits such information to an appropriate indicator.

Figure 10:
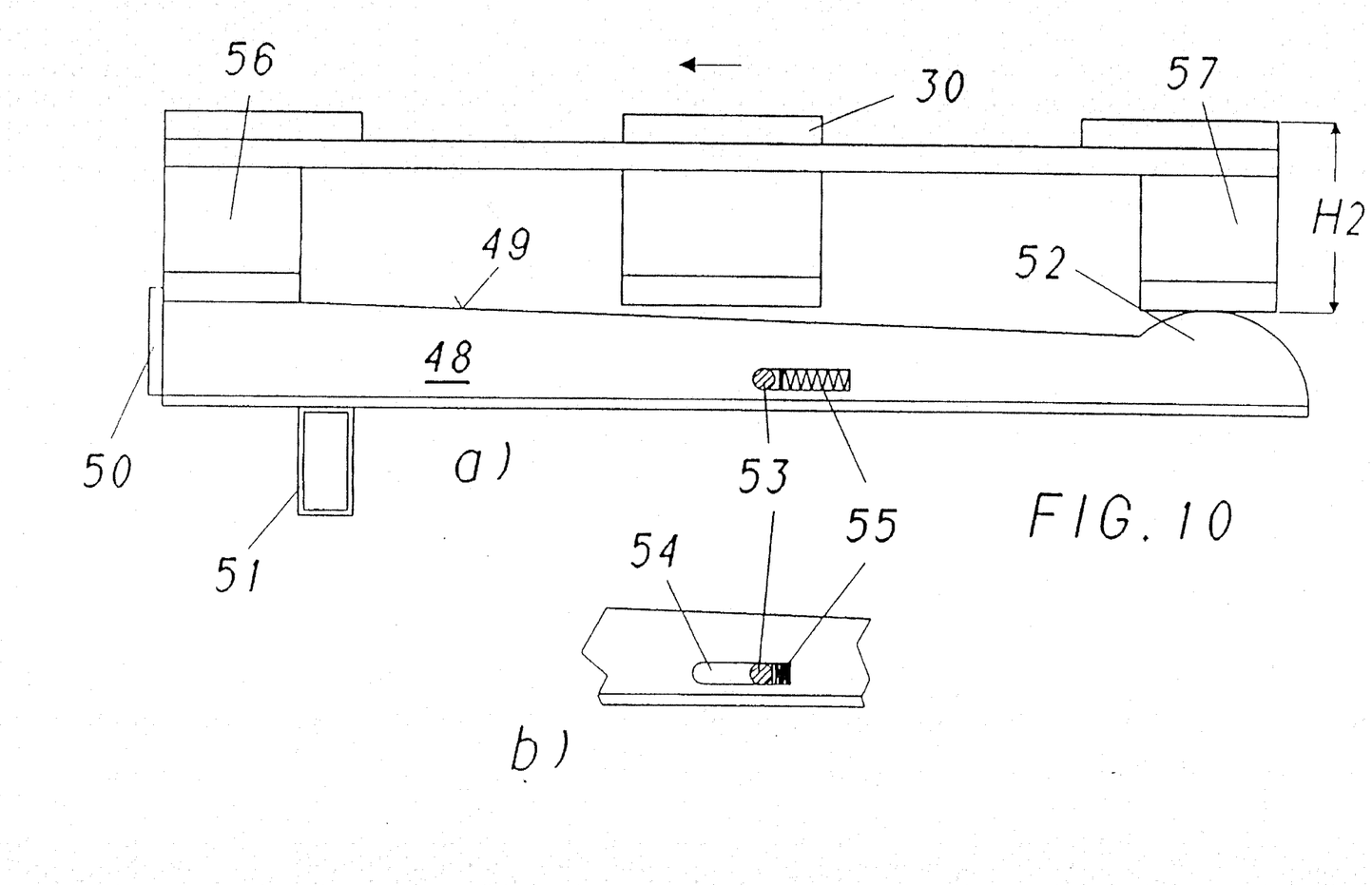
FIG. 10 a preferred example embodiment of a braking mechanism for braking the pallets on a pallet-support rail according to the invention, having a resilient element (55) in normal condition (FIG. 10a) and in compressed condition (FIG. 10b)

In connection with the operational concepts described above, it has already been mentioned that, under particular conditions an end abutment with a braking mechanism is necessary for the pallets in a channel. A preferred example embodiment of such a mechanism is illustrated in FIG. 10, in which the resting position of a pallet after braking is illustrated in the part FIG. 10a, whereas the segment illustrated in the part FIG. 10b illustrates the braking process.

The braking apparatus includes a brake rocker arm 48 extending in the direction of the shelving channel 31, 31a–d. The rocker arm, by means of a longitudinally elongated slot 54, is mounted so as to be longitudinally displaceable with regard to a fixed mounting pin 53, and can be supported on a cross brace 51. A pallet to be braked can slide upon the brake rocker arm 48. An abutment 50 is provided on the end of the brake rocker arm 48 which is directed toward the entrance of the storage channel. Within the slot 54 there is provided a spring element 55 (schematically illustrated in FIG. 10), in particular in the form of an elastomer, i.e. element. The spring element 55 is compressed in the slot 54 by the mounting pin 53 (FIG. 10b), whenever a pallet strikes the abutment 50 with its front cross member 56. At the end of the brake rocker arm 48 which is remote from the entrance to the storage channel, there is provided a cam 52, by which the abutment 50 is raised up to an operational position whenever the rearward cross member 57 of a pallet slides into position and presses the cam downwardly. Even before reaching the abutment 50, a braking effect comes into play because the upper surface of the brake rocker arm 48 is pressed against the forward cross member 56 of the pallet. If required, this upper surface can be provided with an additional braking coating.

Although the above description deals with the use of the inventive pallet-support rails only in the context of a complete slide-in storage unit, it is of advantage to equip individual pallet transport tracks or similar devices with these pallet-support rails because of the much-improved operational characteristics that result with lower assembly heights and easy running.

Finally, it is also conceivable to utilize other compact forms for the lateral guidance of the pallet support chain 2. Two further possibilities, utilizing for lateral guidance not the side straps 13*a, b* but rather the support rollers themselves, are illustrated in FIGS. 11 and 12 in the form of example embodiments which are comparable in construction to that of FIG. 1.

Figure 11:
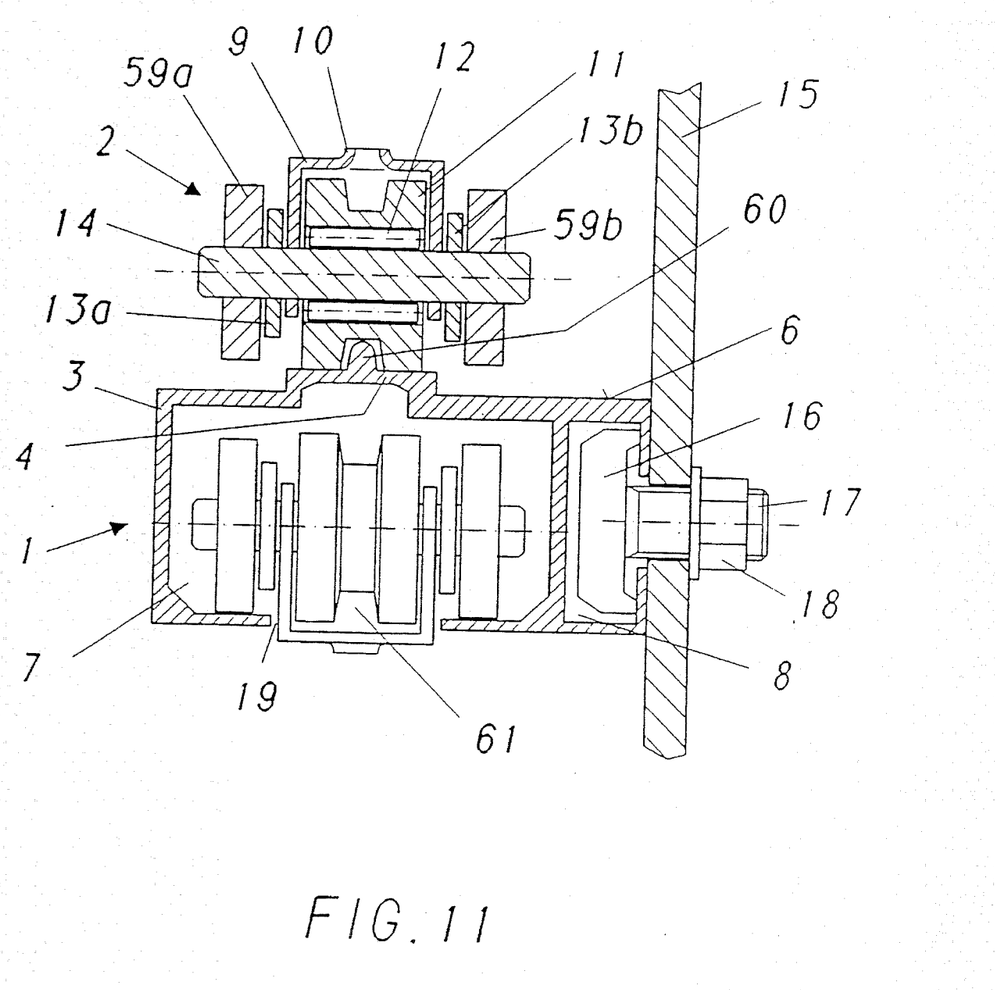
FIG. 11 an example embodiment, similar to FIG. 1, of a pallet-support rail according to the invention, with lateral guidance for the support rollers by way of a circumferential guidance groove and a corresponding guidance rib on the running rail.

The example of FIG. 11 shows support rollers 11 which are constructed as flange rollers, i.e. they have an intermediate portion of reduced diameter. The reduced middle portion constitutes a circumferential guidance groove 61, into which projects a guide rail 60 provided on the running rail 4, thus ensuring lateral guidance. In this case the side straps 13*a, b* can be constructed as desired, because they are not used for lateral guidance. In particular, it is not necessary to space the side straps 13*a, b* outwardly for the sake of low friction, if outer additional side rollers 59*a,b* are provided on the chain pins 14, as shown in FIG. 11, because they further reduce the friction, within the return channel 7, between the chain and the support profile 3. Obviously, in this connection there is a further solution which reverses the groove and rail, wherein a groove is provided in the running track 4 while the support rollers 11 define a circumferential rib in the middle region, the rib engaging the groove and thus ensuring lateral guidance. In this case, however, there is the drawback that the groove in the running rail is more easily contaminated.

Figure 12:
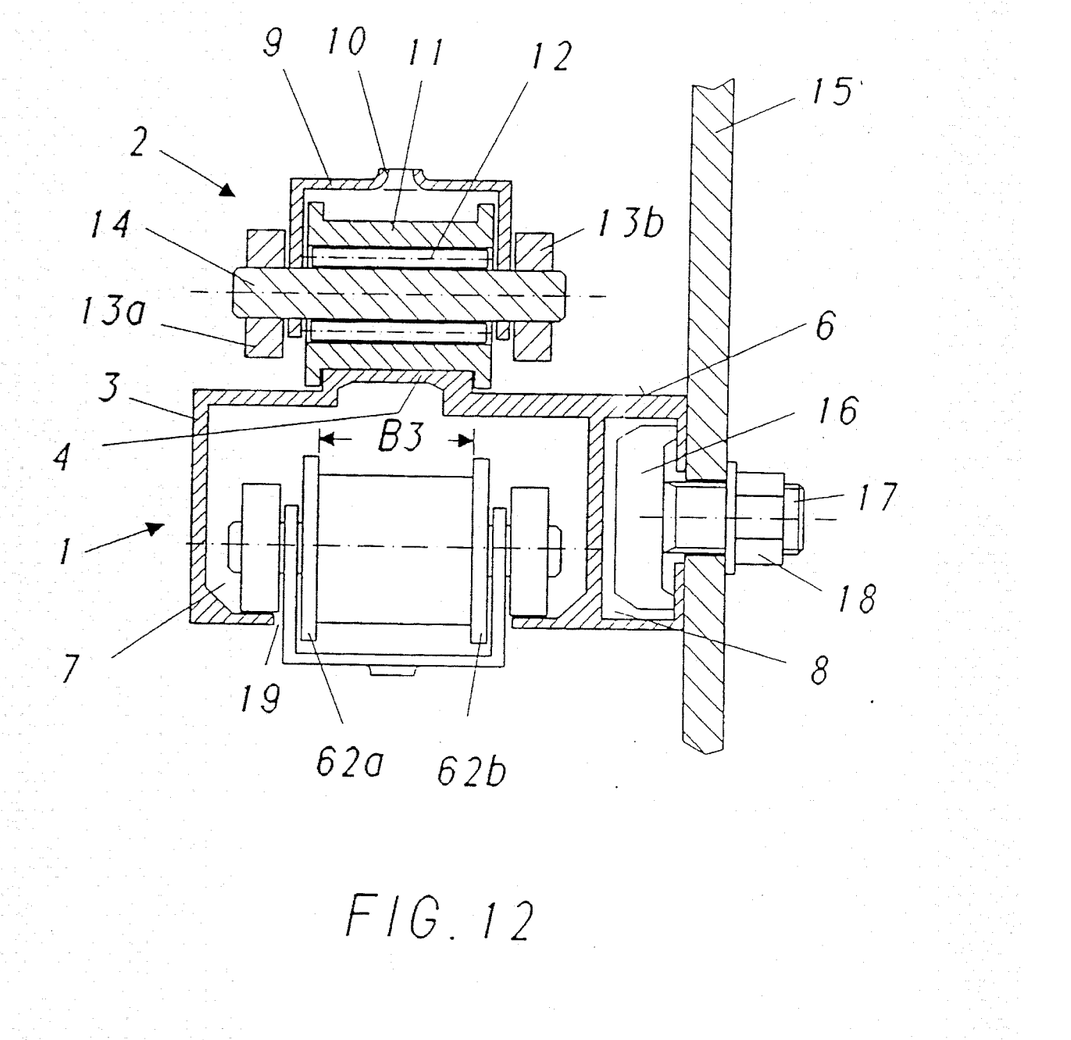
FIG. 12 an example embodiment, comparable to FIG. 11, with lateral guidance provided by roller rims on the support rollers.

The example of FIG. 12 shows a further solution, wherein the support rollers provide the lateral guidance. In this case, the support rollers 11 are constructed as rim rollers, having raised edges 62*a,b*. The distance B3 separating the roller rims 62*a,b* is selected in the same way as the spacing B1 of the running rail 4 shown in the example of FIG. 1. The roller rims 62*a,b* have a diameter such that they project downwardly beyond the running surface, thus ensuring the lateral guidance. Also in this case, the side straps 13*a, b* may have a wide variation in configuration.

In summary, this invention provides a transport system for pallets and similar containers which is notable for its small height and simple operation. Also it can be retro fitted to existing storage units. Finally, it is easy to service and unlikely to break down.

REFERENCE LIST

| | |
|---|---|
| 1, 1a–d | Pallet-support rail |
| 2, 2a–d | Pallet-support chain |
| 3 | Support profile |
| 4 | Running rail |
| 5 | Running surface |
| 6 | Support surface |
| 7 | Return channel |
| 8 | Attachment channel |
| 9 | Support strap |
| 10 | Rib |
| 11 | Support roller |
| 12 | Support roller bearing (roller bearing) |
| 13, 13a, b | Side straps |
| 14 | Chain pin |
| 15 | Side portion |
| 16 | Hammerhead fastener |
| 17 | Bolt thread |
| 18 | Nut |
| 19 | Slot-shaped opening |
| 20, 20a, d | Chain reversal mechanism |
| 21 | Reversal Wheel |
| 22 | Tooth |
| 23 | Reversal Element with fixed Support Curve |
| 24 | Reversal Element with resiliently mounted Support Curve |
| 25 | Outer Ring |
| 26 | Resilient Intermediate Ring (Rubber) |
| 27 | Inner Ring |
| 28 | Slide-In Storage Unit |
| 29 | Storage Unit Support |
| 30 | Pallet |
| 31, 31a–d | Storage Unit Channels |
| 32, 32a–d | Rearward Reversal Mechanism |
| 33, 33a–d | Return Cable |
| 34 | Spacer sleeve |
| 35 | Serration |
| 36 | Slot |
| 37 | Resilient Cable |
| 38 | Reversal Roller (Resilient Cable) |
| 39 | Brush |
| 40 | Control Apparatus |
| 41 | Reversal Roller (Return Cable) |
| 42a, b | Pallet-Support Chain |
| 43a, b | Return Cable |
| 44a, b | Reversal Roller (Return Cable) |
| 45 | Axle (Reversal Roller) |
| 46a, b | Reversal Roller |
| 47a, b | Reversal Roller |
| 48 | Brake Rocker Arm |
| 49 | Braking Surface |
| 50 | Detent |
| 51 | Cross Brace |
| 52 | Cam |
| 53 | Bearing peg |
| 54 | Mounting Opening (Slot-Like) |
| 55 | Resilient Element (Elastomer) |
| 56 | Forward Cross Member (Pallet) |
| 57 | Rearward Cross Brace (Pallet) |
| 58 | Roller Slots |
| 59a, b | Lateral Roller |
| 60 | Guiding Rail |
| 61 | Guiding Groove |
| 62a, b | Roller Rim |
| B1 | Width of Running Rail 4 |
| B2 | Distance between the pair of side straps 13a, b |
| B3 | Spacing between the roller rims 62a, b |
| D | Spacing between the side straps |
| H1 | Height of the pallet-support rail |
| H2 | Height of a Euro-pallet |
| OT | Upper Reach |
| UT | Lower Reach |

I claim:

1. A pallet-support rail for conveying transportation goods, including:

(a) a pallet-support chain (2, 2*a–d*) in the form of a roller chain with a plurality of equally spaced support rollers (11) arranged one behind the other;

(b) a running rail (4) for supporting the support rollers on which the support rollers (11) roll; and (c) a plurality of support straps (9) for supporting the transportation goods which are connected to the support rollers (11) and are displaceable on the running rail (4) by way of the support rollers (11);

(d) means are provided on the support rollers (11) for the lateral guidance of the support rollers (11);

(e) one end of the pallet-support rail (1, 1*a–d*), being provided with a chain reversal mechanism (20, 20*a–d*) which reverses the direction of the pallet-support chain (2, 2*a–d*) and thus divides the pallet-support chain into an upper reach (OT) and a lower reach (UT) lying directly beneath;

(f) the running rail (4) being part of a support profile (3); and the support profile (3) is formed as a mainly closed return channel (7) below the running rail (4), in which return channel (7) the lower reach (UT) of the pallet-support chain (2, 2a–d) is received and guided, (g) the upper reach and the lower reach (OT, UT) together constituting a circulating conveyor, which at the other end of the pallet-support rail (1, 1a–d) is entrained over a rearward reversal mechanism (32a–d), and only about half of the length of the circulating conveyor being constructed as a pallet-support chain (2, 2a–d) having two ends, while the other half of the conveyor being constituted by a connecting element, which connect the ends of the pallet-support chain (2, 2a–d) in order to transfer pulling forces.

2. A pallet-support rail according to claim 1, wherein the connecting element includes a rope-like connecting element which is entrained over a reversing roller (41) in the rearward reversal mechanism (32a–d).

3. A pallet-support rail according to claim 2, wherein the rope-like connecting element is resilient and serves as a tension element for the pallet-support chain (2, 2a–d).

4. A pallet-support rail according to claim 3, wherein there is provided, at the connection location between the rope-like connecting element and the pallet-support chain (2, 2a–d) in the upper reach (OT), a brush 39 which cleans the upper surface of the running rail (4) with each forward and backward movement of the pallet-support chain (2, 2a–d).

5. A pallet-support rail according to claim 4, wherein a resilient cable (37) is provided between the pallet-support rail (1, 1a–d) and the chain, in which the resilient cable (37) has a low level of tension when the pallet-support chain (2, 2a–d) is primarily located in the lower reach (UT), and develops a gradually increasing return tension the further the pallet-support chain (2, 2a–d) is withdrawn out of the lower reach (UT) and into the upper reach (OT).

6. A slide-in storage unit for storing transportation goods, the slide-in storage unit (28) including a plurality of shelf channels (31, 31a–d) arranged sidewardly adjacent and/or one above the other, with a plurality of pallet spaces arranged one behind the other for the successive storage and removal of a plurality of pallets and containers from one end of the shelf, wherein, for the transportation of transportation goods, there is provided in each shelf channel (31, 31a–d) at least two pallet-support rails (1, 1a–d) arranged in parallel;

each of the pallet support rails including a pallet-support chain (2, 2a–d) in the form of a roller chain with a plurality of equally spaced support rollers (11) arranged one behind the other, a running rail (4) for supporting the support rollers on which the support rollers (11) roll, a plurality of support straps (9) for supporting the transportation goods which are connected to the support rollers (11) and are displaceable on the running rail (4) by way of the support rollers (11), and means being provided on the support rollers (11) for the lateral guidance of the support rollers (11);

the pallet-support rails (1, 1a–d) of the slide in storage unit each extending integrally over several pallet spaces, and preferably over the entire length of the shelf channel (31, 31a–d);

the pallet-support rails (1, 1a–d) being constructed with a slight inclination, preferably equal to or smaller than 2%, particularly around 1%, tilted toward the exit for the storage unit;

means being provided to ensure the tandem running of the pallet support chains (42a,b) in each shelf channel (31, 31a–d);

in each of the pallet-support rails (1, 1a–d), the upper reach (OT) and the lower reach (UT) together forming a closed-loop conveyor, which at the other end of the pallet-support rail (1, 1a–d) is entrained over a rearward reversal mechanism (32a–d); only about half the length of the closed loop being formed as a pallet-support chain (2, 2a–d) having two ends, the other half of the loop consisting of connecting element which connects the ends of the pallet-support chain (2, 2a–d) in order to transfer pulling forces; the rope-like connecting element which being entrained over a reversal roller (44a–b) in the rearward reversal mechanism (32a–d); and the means for ensuring tandem running motion including an axle (45) which connects the reversal rollers (44a,b) of each shelf channel (31, 31a–d) with each other.

7. A slide-in storage unit for storing transportation goods, the slide-in storage unit (28) including a plurality of shelf channels (31, 31a–d) arranged sidewardly adjacent and/or one above the other, with a plurality of pallet spaces arranged one behind the other for the successive storage and removal of a plurality of pallets and containers from one end of the shelf, for the transportation of transportation goods, there being provided in each shelf channel (31, 31a–d) at least two pallet-support rails (1, 1a–d) arranged in parallel with corresponding pallet-support chains (42, 42a–b);

each pallet-support rail including a pallet-support chain (2, 2a–d) in the form of a roller chain with a plurality of equally spaced support rollers (11) arranged one behind the other, a running rail (4) for supporting the support rollers on which the support rollers (11) roll, a plurality of support straps (9) for supporting the transportation goods which are connected to the support rollers (11) and are displaceable on the running rail (4) by way of the support rollers (11); means being provided on the support rollers (11) for the lateral guidance of the support rollers (11), the pallet-support rails (1, 1a–d) of the slide in storage unit each extending integrally over several pallet spaces, and preferably over the entire length of the shelf channel (31, 31a–d);

there being provided, at the entry to each shelf channel (31, 31a–d), a braking apparatus which automatically brakes a pallet rolling along the pallet-support chain (42a,b) of the channel in the direction of the entry, and brings the pallet to a halt against a detent;

the braking apparatus including a rocker arm (48) extending in the direction of the shelf channel (31, 31a–d), the rocker arm, by means of a journal box (54) formed as a longitudinal slot, being mounted about a fixed peg (53) so as to be longitudinally displaceable, the rocker arm being such that a pallet to be braked can slide thereon; there being provided, on the end of the rocker arm (48) which extends toward the entry of the storage channel (31, 31a–d), a detent (50) for the pallet to be braked, a spring element (55) being provided within the journal box (54), the spring element being compressed by the peg (53) when a pallet strikes the detent (50); and there being provided a cam (52) on the end of the rocker arm (48) which is remote from the entry to the shelf channel (31, 31a–d), the cam causing the detent (50) to move upwardly into operative position when the rearward cross brace (57) of a pallet slides over the cam.

8. A pallet-support rail for conveying transportation goods, including:

(a) a pallet-support chain (2, 2a–d) in the form of a roller chain with a plurality of equally spaced support rollers (11) arranged one behind the other;

(b) a running rail (4) for supporting the support rollers on which the support rollers (11) roll; and (c) a plurality of support straps (9) for supporting the transportation goods which are connected to the support rollers (11) and are displaceable on the running rail (4) by way of the support rollers (11);

(d) means being provided on the support rollers (11) for the lateral guidance of the support rollers (11);

(e) at one end of the pallet-support rail (1, 1a–d), there being provided a chain reversal mechanism (20, 20a–d) which reverses the direction of the pallet-support chain (2, 2a–d) and thus divides the pallet-support chain into an upper reach (OT) and a lower reach (UT) lying directly beneath;

(f) the height (H1) of the pallet-support rail (1, 1a–d), with the upper reach (OT) and the lower reach (UT), not, or not significantly, exceeding three times the diameter of the support rollers (11) and/or half the height (H2) of a standard euro-pallet;

(g) the chain reversal mechanism (20, 20a–d) being constructed such that the overall height (H) is maintained even in the reversal region;

(h) the chain reversal mechanism (20, 20a–d) including a reversal element (23) with a rigid support curve, upon which support curve the support rollers (11) of the pallet-support chain (2, 2a–d) run during the reversal.

9. A pallet support rail according to claim 8, wherein the reversal element (23) is non-rotating and has the form of a droplet.

10. A pallet-support rail according to claim 8, wherein, (a) the support rollers (11) are connected in pairs at both ends through a pair of side straps (13, 13a, b);

(b) the running rail (4) is smaller in width (B1) than the spacing (B2) between the two side straps (13a, b) of a pair; and (c) the side straps (13, 13a, b) project downwardly far enough that they transfer lateral forces sideways from outside onto the running rail (4) and thus laterally guide the pallet-support chain (2, 2a–d).

11. A pallet-support rail according to claim 8, wherein, (a) the support rollers (11) are configured as edge-rimmed rollers and have roller rims (62a,b) at their extremities;

(b) the running rail (4) has a width (B1) which is smaller than the spacing (B3) between the roller rims (62a,b); and (c) the roller rims (62a,b) project far enough downwardly that they transfer lateral forces sidewards from outside onto the running rail (4), and thus laterally guide the pallet-support chain (2, 2a–d).

12. A pallet-support rail according to claim 8, wherein the support rollers (11) in the pallet-support chain (2, 2a–d) are connected together in pairs through side straps (13, 13a, b) and the support straps (9); the support straps (9) and side straps (13, 13a, b) being alternatingly arranged such that each support strap and a neighboring pair of side straps have one support roller in common, and in that the support rollers (11) are each rotatably mounted on a chain pin (14), the chain pin (14) being firmly connected to the side straps (13, 13a, b) of a pair.

13. A pallet-support rail according to claim 12, wherein the chain pins (14) are press-fit into the side straps (13, 13a, b).

14. A pallet-support rail according to claim 12, wherein the chain pins (14) are constructed as threaded bolts and are threadably connected with the side straps (13, 13a, b) utilizing a spacer sleeve (34) which is between the side straps (13, 13a, b), wherein the support rollers (11) are rotatably mounted about the respective spacer sleeves (34).

15. A pallet-support rail according to claim 14, wherein the support rollers (11) are mounted by means of a roller bearing (12).

16. A pallet-support rail according to claim 12, wherein, to facilitate the assembly of the pallet-support chain (2, 2a–d), downwardly-open and inwardly obliquely directed slots (36) are provided in the support straps (9) for the chain pins (14), so that the chain pins (14) can be shoved into place with sidewards motion.

17. A pallet-support rail according to claim 8, wherein, (a) the running rail (4) is part of a support profile (3); and (b) the support profile (3) is formed as a mainly closed return channel (7) below the running rail (4), in which return channel (7) the lower reach (UT) of the pallet-support chain (2, 2a–d) is received and guided.

18. A pallet-support rail according to claim 17, wherein there is laterally provided in the support profile (3) an attachment channel (8) for receiving mounting means, particularly in the form of hammerhead fasteners (16).

19. A slide-in storage unit for storing transportation goods, the slide-in storage unit (28) including a plurality of shelf channels (31, 31a–d) arranged sidewardly adjacent and/or one above the other, with a plurality of pallet spaces arranged one behind the other for the successive storage and removal of a plurality of pallets and containers from one end of the shelf, wherein, for the transportation of transportation goods, there being provided in each shelf channel (31, 31a–d) at least two pallet-support rails (1, 1a–d) arranged in parallel with corresponding pallet-support chains (42, 42a–b) in accordance with claim 8, and the pallet-support rails (1, 1a–d) each extending integrally over several pallet spaces, and preferably over the entire length of the shelf channel (31, 31a–d).

20. A slide-in storage unit according to claim 19, wherein the pallet-support rails (1, 1a–d) are constructed with a slight inclination, preferably equal to or smaller than 2%, particularly around 1%, tilted toward the exit for the storage unit.

21. A slide-in storage unit according to claim 20, wherein means are provided to ensure the tandem running of the pallet support chains (42a,b) in each shelf channel (31, 31a–d).

22. A slide-in storage unit according to claim 19, wherein, on at least one pallet-support rail (1, 1a–d) of each shelf channel (31, 3 1a–d), there being provided means for determining the position of the respective pallet-support chain (2, 2a–d, 42a,b).

23. A slide-in storage unit according to claim 22, wherein the determining means includes an optical coding of individual members and/or segments of the pallet-support chain (2, 2a–d, 42a–b).

24. A slide-in storage unit according to claim 22, wherein the determining means includes a control device (40) which automatically detects individual members and/or segments of the pallet-support chain (2, 2a–d, 42a,b) from which it determines the position of the chain, which it transmits to the display.

25. A slide-in storage unit according to claim 19, wherein there is provided, at the entry to each shelf channel (31, 31a–d) a braking apparatus which automatically brakes a pallet rolling along the pallet-support chain (42a,b) of the channel in the direction of the entry, and brings the pallet to a halt against a detent.

26. A transportation track for the conveying transportation goods, wherein the transportation track has at least two pallet-support rails arranged in parallel, with corresponding pallet-support chains (42a–b) according to claim 8.

* * * * *